United States Patent

Iwasaki

[11] Patent Number: 5,880,833
[45] Date of Patent: Mar. 9, 1999

[54] SPECTROMETER

[75] Inventor: Takashi Iwasaki, Tokyo, Japan

[73] Assignee: Ando Electric Co., Ltd., Tokyo, Japan

[21] Appl. No.: 959,201

[22] Filed: Oct. 28, 1997

[30] Foreign Application Priority Data

Oct. 31, 1996 [JP] Japan ................................. 8-290853

[51] Int. Cl.$^6$ ...................................................... G01J 3/28
[52] U.S. Cl. .......................................... 356/328; 356/329
[58] Field of Search ..................................... 356/328, 329

[56] References Cited

U.S. PATENT DOCUMENTS 5,192,981  3/1993  Slutter et al. ........................... 356/334
5,276,499  1/1994  Minakawa et al. ................... 356/328 X

FOREIGN PATENT DOCUMENTS 3224737  5/1984  Germany .

Primary Examiner—Robert Kim
Attorney, Agent, or Firm—Fish & Richardson P.C.

[57] ABSTRACT

An optical spectrum measuring apparatus is disclosed which is able to accurately measure the optical spectrum without an influence and to measure the light intensity per unit frequency without an influence of the change of the bandwidth of the wavelength because of the measured wavelength. The diffraction grating 4 emits the diffracted light with an appropriate wavelength corresponding to the incident angle after diffracting the parallel light. The outgoing light slit 6 passes the diffracted light with a length shorter than the slit width. The AD converter 9 measures the intensity of the diffracted light passed through the outgoing light slit 6. CPU 12 controls the incident angle and the width of the slit. The memory of the bandwidth of the wavelength 14 stores the bandwidth of the passed wavelength and the measured light intensity is adjusted with the bandwidth of the passed wavelength. Also the bandwidth of the passed wavelength is converted to the frequency and the measured light intensity is adjusted by the bandwidth of passed wave frequency.

4 Claims, 4 Drawing Sheets

SPECTROMETER

BACKGROUND OF THE INVENTION

1. Field of the Invention

The present invention relates to an optical spectrum measuring apparatus for measuring the optical spectrum characteristics of a light source.

This application is based on patent application No. Hei 08-290853 filed in Japan, the content of which is incorporated herein by reference.

2. Description of the Related Art

A conventional optical spectrum measuring apparatus as shown in FIG. 3 will be explained below. FIG. 3 shows a light source 51, and a spectroscope 70 which is formed as a "Czerny-Turner-Type" dispersion spectroscope. This spectroscope is comprised of incident light slit 52, concave surface mirrors 53 and 55, diffraction grating 54, and outgoing light slit 56.

The apparatus also contains optical detector 57, amplification circuit 58, AD converter 59, motor 60, drive circuit 61, CPU (Central Processing Unit) 62, display section 63 and a slit control unit 65.

In this example, a beam from the light source 51 is incident on the incident light slit 52. The light is converted into a parallel beam by the concave surface mirror 53 and is incident on the diffraction grating 54.

A plurality of grooves is formed on the surface of the diffraction grating 54. The diffraction grating 54 can be rotated through an arbitrary angle around an axis parallel to these grooves by means of the motor 60. The drive circuit 61 changes the angle of the diffraction grating 54 by controlling the motor 60 according to the instructions from the CPU 62.

From the above-mentioned parallel beam, the diffraction grating 54 reflects only diffracted light of a particular wavelength component determined by the angle of diffraction grating 54, in the direction of the concave surface mirror 55.

The concave surface mirror 55 images the diffracted light onto the outgoing light slit 56.

Only the wavelength components falling within the width of the outgoing light slit 56 are able to pass through the outgoing light slit 56. At this time, slit control unit 65 sets the width of the outgoing light slit 56 according to the direction of CPU 62.

The optical detector 57 receives the light passing through the outgoing light slit 56, and converts the light into an electrical signal proportional to the optical intensity. The amplification circuit 58 amplifies the output of the optical detector 57 to a voltage appropriate to the input to the AD converter 59. The AD converter 59 converts the output of the amplification circuit 58 into a digital signal.

Following, the measuring steps, CPU 62 gives a direction to the slit control unit 65 and sets the width of the outgoing light slit 56. Next, CPU 62 gives a direction to the drive circuit 61, and sets the wavelength of the wave passing through the outgoing light slit 56 by rotating the angle of the diffraction grating 54. At this time, the strength of the light is taken from the output of the AD converter 59.

The CPU 62 sweeps the wavelength passing through the outgoing light slit 56 from a measurement initiation wavelength to a measurement termination wavelength, and displays the repetitively obtained wavelength and intensity characteristics to the display section 63 as an optical spectrum.

The band width of passing wavelength (or wavelength resolution) RB by the above "Czerny-Turner-Type" dispersion spectroscope is represented approximately as follows, under the condition that focal length of concave surface mirror 53 and of concave surface mirror 55 are the same and that the width of outgoing light slit 56 is greater than that of incident light slit 52.

$$RB = 2d/(m \cdot f) \cdot S \cdot \cos \beta \qquad (1)$$

d is distance of ditch of the diffraction grating 54, m is diffraction degree of the diffraction gating 54, f is focal length of concave surface mirror 53 and 55, and β is an angle of the diffraction light of the diffraction gating 54 and the normal of the diffraction gating 54.

By rotating the diffraction gating 54 in order to vary the wavelength of the wave, β changes. This means the band width of the wavelength changes depending on the wavelength of the wave on the basis of the formula (1).

In order to use the spectroscope 70 for a wide range of the wavelength, diffraction degree of the diffraction gating 54 may be changed. For an example of using the diffraction gating 54 with 900 ditches per one mm, secondary light is used in the range of wavelength of 350 nm~600 nm and primary light is used in the range of wavelength of 600 nm~1750 nm. In this case, the width of outgoing light slit 56 is selected according to the degree of changed diffraction gating 54 to be able to obtain the intended band width of the wavelength for the respective diffraction degree.

The width of the outgoing light slit 56 is determined to obtain the designed resolution at the center of the wavelength measured for each diffraction degree. This results in the band width of the wavelength having a difference between the case of the secondary light and of the primary light.

The above example is designed so that the intended band width of the wavelength is obtained at the wavelength of 550 nm when the secondary light is used, and at 1350 nm when the primary light is used.

FIG. 4 shows the wavelength characteristic of the bandwidth of the wavelength. In the above example, the bandwidth of the wavelength at 600 nm which is a switching point of the degree is 8.5 nm for the secondary light, and is 13 nm for the primary light.

The spectrum of the light to be measured is generally broader than the bandwidth of the wavelength. In other words, in the example with a characteristic of the bandwidth of the wavelength shown in FIG. 4, there is a problem in that the measured optical spectrum has undesirable characteristics of higher values in the range of short wavelengths. There is also a problem in that the optical spectrum is discontinuous at the switching point of the degree.

FIG. 5 shows the result of measurement of the LED optical spectrum using a optical spectrum measuring apparatus with a wavelength of 660 nm as a light source 51. As shown in this FIG. 5, the optical spectrum is discontinuous at the point A.

SUMMARY OF THE INVENTION

It is therefore an object of the present invention to provide an optical spectrum measuring apparatus which is able to measure the correct optical spectrum and the light intensity for unit frequency without an influence of the change of the bandwidth of the wavelength by the different measured wavelengths.

In order to attain the above mentioned object, the present invention provides an optical spectrum measuring apparatus comprising a diffraction gating which diffracts the parallel incident light and outputs the diffracted light according to the incident angle; a outgoing light slit which passes the diffracted light with a wavelength smaller than the width of the slit; a measurement means which measures the light intensity of the diffracted light passing through said outgoing light slit; a control means which controls said width of the slit and said incident angle; and a storage means which stores the bandwidth of the wavelength of the light passing said outgoing light slit; corrects said light intensity according to said bandwidth of the wavelength of the light passing through said outgoing light slit.

The present invention further provides an optical spectrum measuring apparatus which converts said bandwidth of the wavelength of the light passing through said outgoing light slit into frequency, and corrects said light intensity with said bandwidth of the wavelength of the light passing through said outgoing light slit.

The present invention further provides an optical spectrum measuring apparatus comprising a converting means which converts the light into said parallel incident light, a converging mean which converges the diffracted light from said diffraction grating into said outgoing light slit, and a display means which displays the measurement result of said measurement mean.

With the optical spectrum measuring apparatus of the present invention, it is possible for the diffraction grating to diffract the parallel incident light and to output the diffracted light according to the incident angle, for the outgoing light slit to allow to pass the diffracted light with a wavelength according to the width of the slit, for the measurement mean to measure the light intensity of the diffracted light passing through the said outgoing light slit, for the control mean to control the width of the slit and the incident angle, for the storage mean to store the bandwidth of the wavelength of the light passing through the outgoing light slit, and it is possible to correct the light intensity with said bandwidth of the wavelength of the light passing through the outgoing light slit. It is also possible to measure the correct optical spectrum without an influence of the change of the bandwidth of the wavelength by converting the bandwidth of the wavelength of the light passing through the outgoing light slit into frequency and by adjusting the light intensity with the bandwidth of the wavelength of the light passing the outgoing light slit. It is also possible to measure the light intensity per unit frequency without an influence of the change of the bandwidth of the wavelength caused by the different wavelength.

BRIEF DESCRIPTIONS OF THE DRAWINGS

DETAILED DESCRIPTION OF THE PREFERRED EMBODIMENTS

A. Composition

Figure 1:
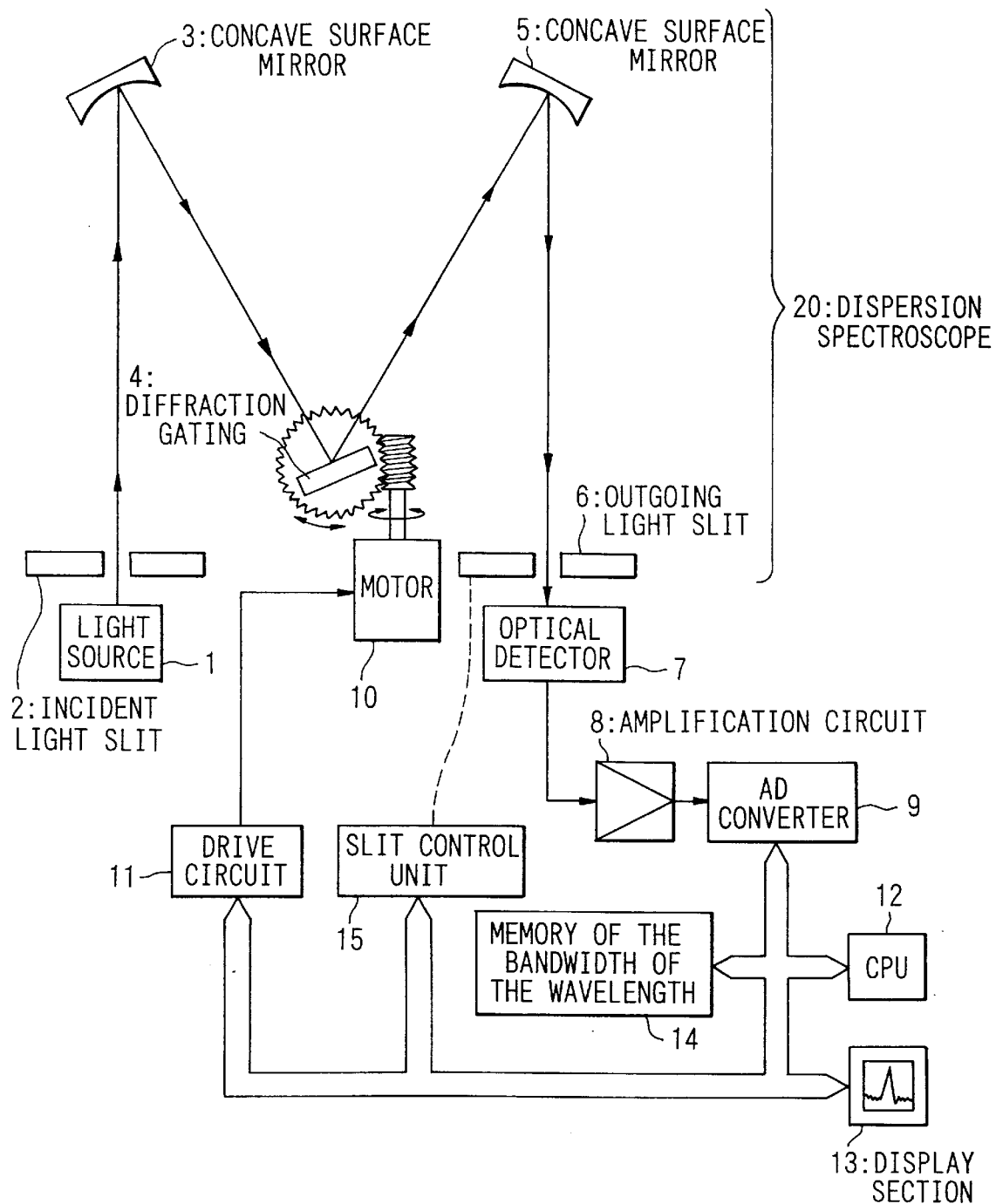
FIG. 1 is a diagram illustrating the composition of an optical spectrum measuring apparatus according to an embodiment of the present invention.

Hereinbelow, an optical spectrum measuring apparatus according to an embodiment of the present invention will be described with reference to FIG. 1 which is a diagram illustrating the composition of the above embodiment. In FIG. 1, a light source 1, an incident light slit 2 and a concave surface mirror 3 are included. The light output by the light source 1 travels toward the concave surface mirror 3 through the incident light slit 2 and is converted to parallel light by the concave surface mirror 3.

The light reflected by the concave surface mirror 3 goes to the diffraction grating 4. A plurality of grooves are formed on the surface of the diffraction grating 4 and the diffraction grating 4 is rotated by the below mentioned motor 10 around an axis which is parallel to the grooves.

The diffraction grating 4 diffracts only the specific wavelength determined by the incident angle of the parallel light.

The light diffracted by the diffraction grating 4 is reflected by the concave surface mirror 5 is focused on the outgoing light slit 6. The outgoing light slit 6 is controlled with the width of the slit by the below mentioned slit control unit 15.

In addition to it, the above-mentioned incident light slit 2, the concave surface mirror 3 and 5, the diffraction grating 54, and the outgoing light slit 6 form the "Czerny-Turner-Type" dispersion spectroscope 20.

The diffracted light passing through the above outgoing light slit is incident on the optical detector 7. The optical detector 7 converts the incident light into the electrical signal in proportion to its intensity and the electrical signal is amplified to the specific level by the amplification circuit 8 and is received by the AD converter 9.

CPU 12 is equipped to control the whole optical spectrum measuring apparatus. The CPU 12 is connected to the AD converter 9, slit control unit 15, drive circuit 11, display section 13 and a memory of the bandwidth of the wavelength 14.

The above drive circuit 11 is constituted by a DA converter and a power amplifier (not shown in FIG. 1) and controls the motor 10 by the direction of the CPU 12.

The diffraction grating 4 receives the direction by the CPU 12 and can be rotated by an arbitrary angle via the drive circuit 11. At the same time, the diffraction grating 4 reflects only the diffracted light with a specific wavelength determined by an arbitrary angle from the incident light.

The slit control unit 15 varies the open width of the outgoing light slit 6 under the control of the CPU 12. At the same time, only the light with a wavelength shorter than the width of the outgoing light slit 6 passes through the outgoing light slit 6.

The characteristics of the bandwidth of the passed wavelength for the measured wavelength by the dispersion spectroscope 20 is stored in the memory of the bandwidth of the wavelength 14. For example, in the embodiment of the present invention, the bandwidth of the wavelength is stored for every 10 nm in the range of from 350 nm to 1750 nm. The value which is actually measured or calculated is stored in advance.

The CPU 12 sweeps the wavelength passing through the outgoing light slit 6 from a measurement initiation wavelength to a measurement termination wavelength, and displays the repetitively obtained wavelength and intensity characteristics to the display section 13 as an optical spectrum.

B. First Method of Measuring

Next, a method of measuring with an adjustment to the optical spectrum by an application of the preferred embodiment of the present invention will be described. First, in the preferred embodiment of the present invention, the CPU 12 gives a command to the slit control unit 15 and sets the width of the outgoing light slit 6.

Next, the CPU 12 sets the wavelength to pass through the outgoing light slit 6 by giving a command to the drive circuit 11 to vary the angle of the diffraction gating 4. After that, the light intensity of the outgoing light is received from the output of the AD converter 9.

In this way, the CPU 12 sweeps the wavelength passing through the outgoing light slit 6 from a measurement initiation wavelength to a measurement termination wavelength, and displays the repetitively obtained wavelength and intensity characteristics to the display section 13 as an optical spectrum.

The optical spectrum measured in this way is represented as $P(\lambda)$. $\lambda$ represents the wavelength at each measuring point in the range of wavelength to be measured. For example, $\lambda$ proceeds as 600.0, 600.1, ..., 700.0 in the case of measuring at 0.1 nm intervals from 600 nm to 700 nm.

The $P(\lambda)$ represents the light intensity measured at the wavelength of $\lambda$. Thus the optical spectrum is displayed on the display section 13 as an X-Y graph with the abscissa (X) of $\lambda$ and the ordinate (Y) of $P(\lambda)$.

Next, the bandwidth of the wavelength $RB(\lambda)$ corresponding to the each measuring point $\lambda$ is determined based on the bandwidth of the wavelength stored in the memory of the bandwidth of the wavelength 14. In the case in which the wavelength corresponding to each measuring point is not stored, $RB(\lambda)$ is determined by such a way of linear interpolation based on the nearest value of the bandwidth of the wavelength stored in the memory.

Further, $PO(\lambda)$, which was a adjusted optical spectrum, is determined by the following formula.

$$PO(\lambda)=P(\lambda)/RB(\lambda)$$

After that, CPU 12 displays the $PO(\lambda)$ on the display section 13 as an adjusted optical spectrum.

By this method, the bandwidth of the wavelength which is previously measured corresponding to each measured wavelength with the dispersion spectroscope 20 is stored in the memory of the bandwidth of the wavelength 14, and the measured optical spectrum is adjusted with a bandwidth of the wavelength of the dispersion spectroscope 20 corresponding to the measured wavelength.

Figure 2:
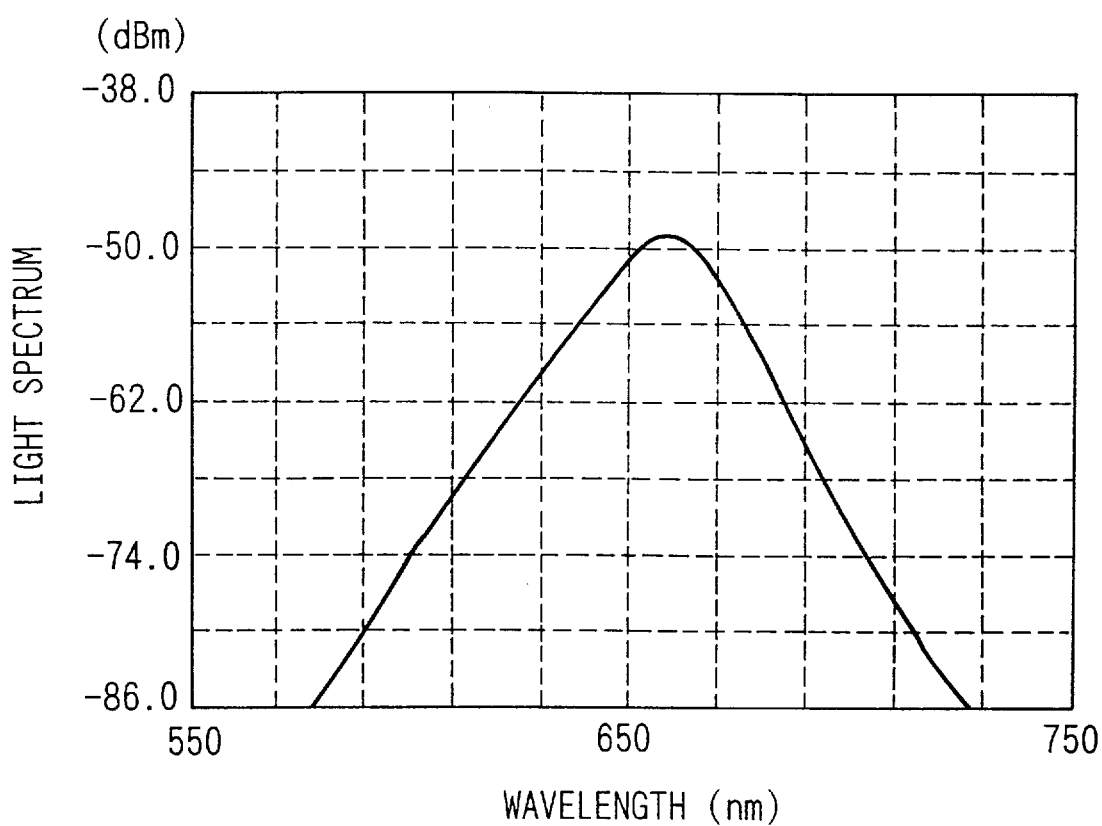
FIG. 2 is a graph showing a measurement by above embodiment of the present invention.
Figure 3:
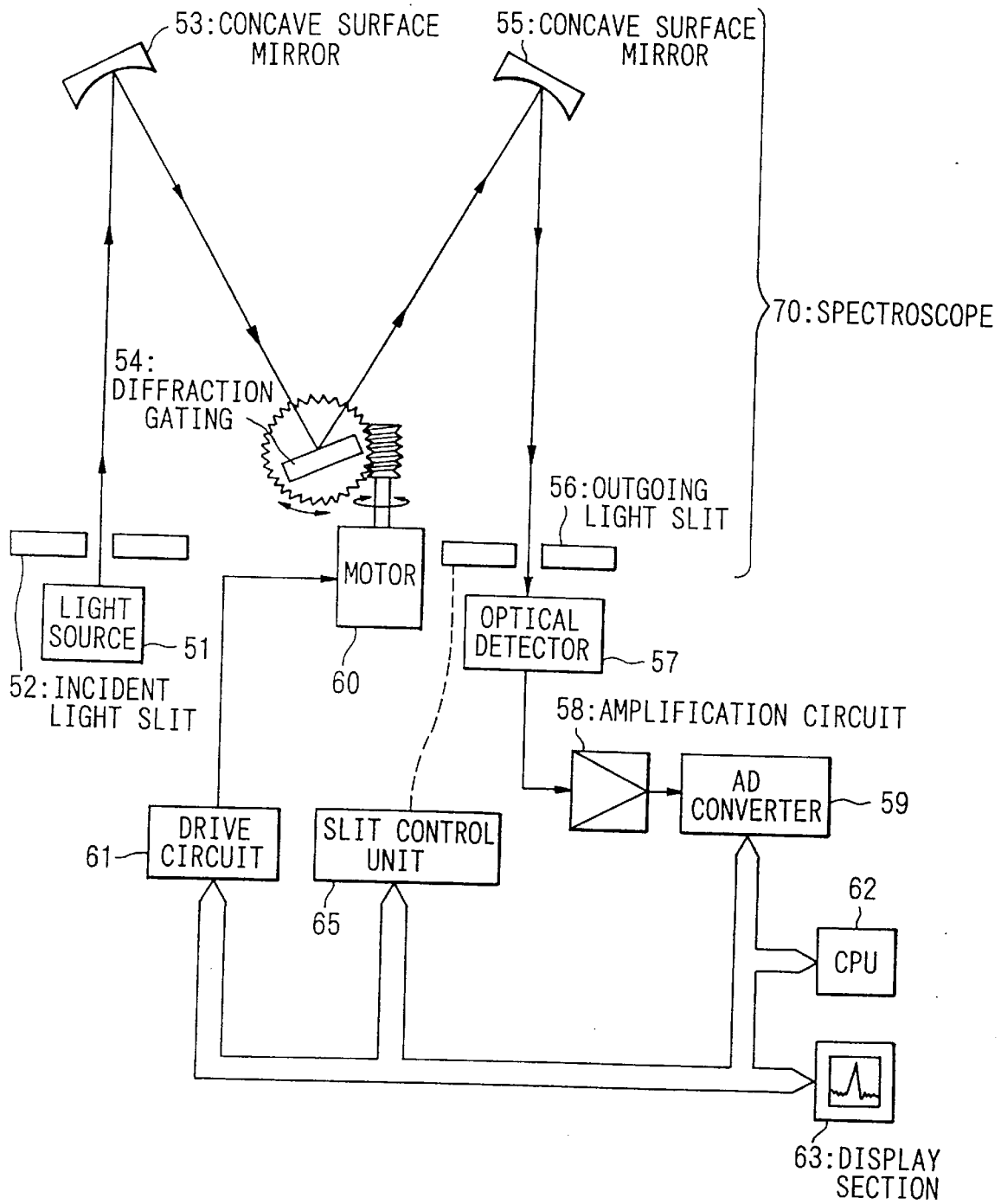
FIG. 3 is a diagram illustrating a composition of a conventional optical spectrum measuring apparatus.
Figure 4:
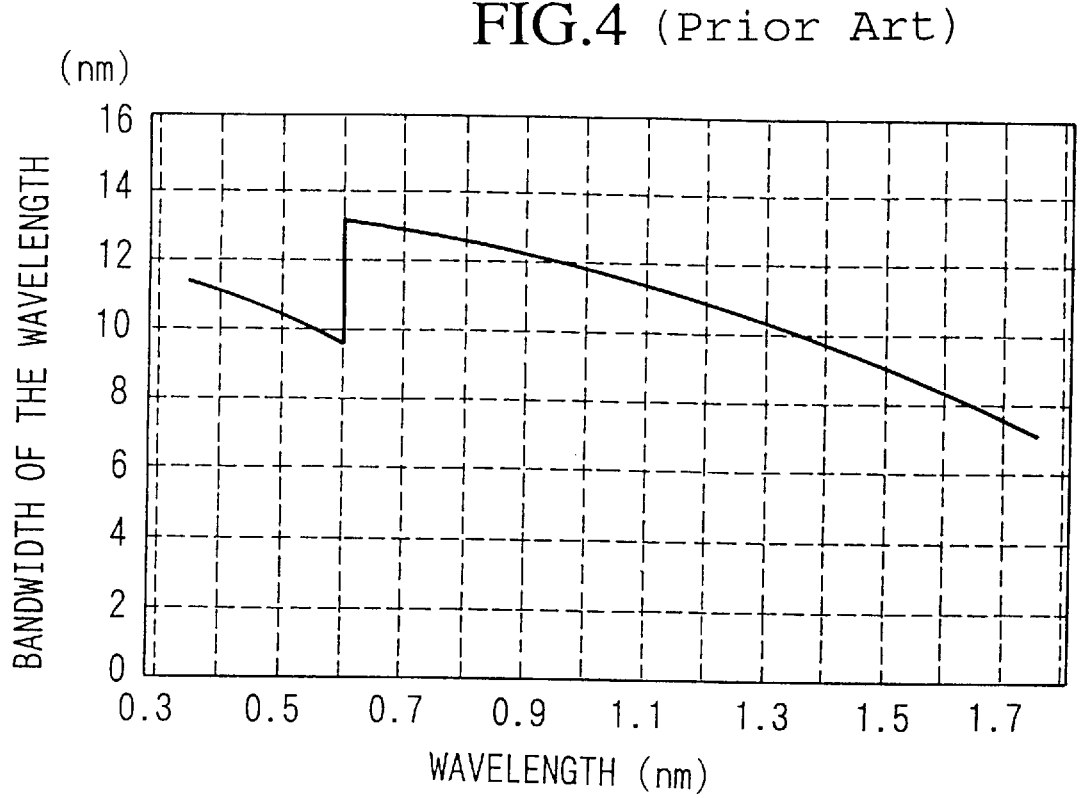
FIG. 4 is a graph showing the wavelength characteristics of the bandwidth of the wavelength.
Figure 5:
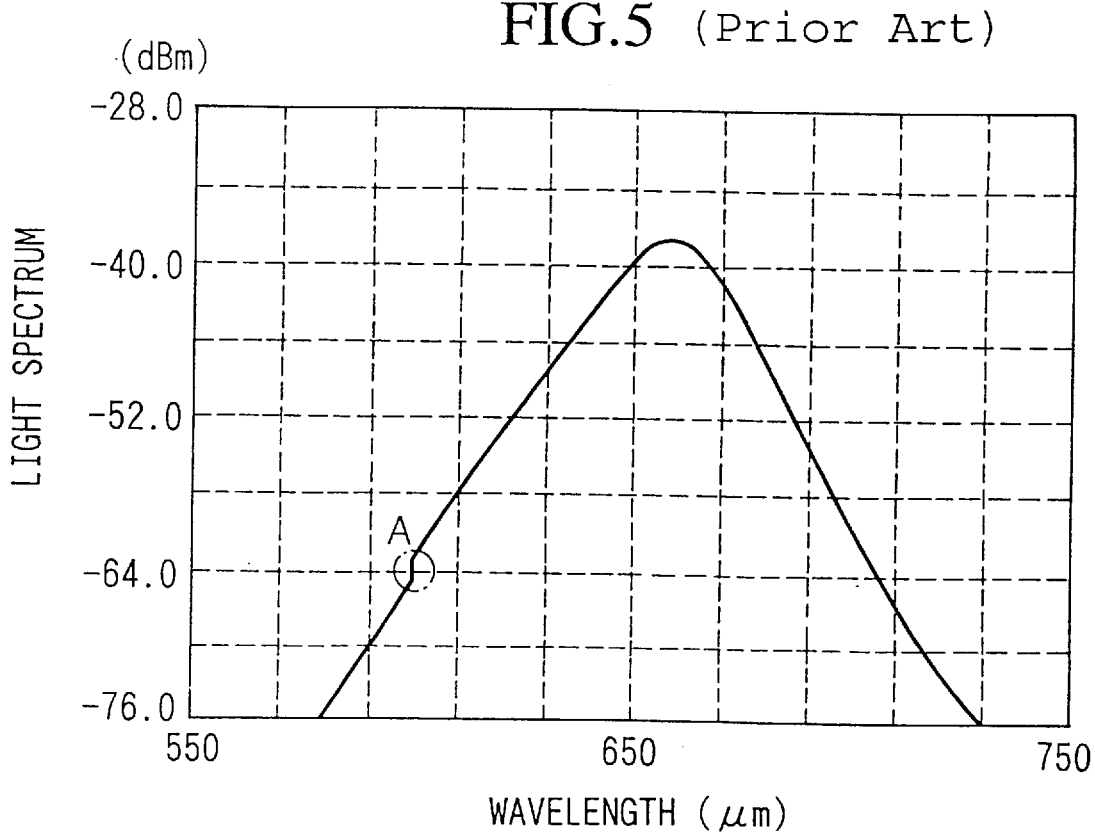
FIG. 5 is a graph showing the measurement by an optical spectrum with a composition illustrated in FIG. 3 and with a characteristic shown in FIG. 4.

As the above $PO(\lambda)$ is adjusted with the bandwidth of the wavelength, a correct optical spectrum can be displayed even in cases of inconstant bandwidth of the wavelength in the range of measuring wavelength and of having a discontinuously changing point of the bandwidth of the wavelength in the range of the whole wavelength. FIG. 2 shows a result measured by the embodiment of the present invention.

C. Second Method of Measuring

Next, another method of adjusting the measuring applied to the embodiment of the present invention will be explained.

First, the bandwidth of the wavelength $RB(\lambda)$ corresponding to each measuring point $\lambda$ is determined based on the bandwidth of the wavelength stored in the memory of the bandwidth of the wavelength 14.

Here, in a case like that mentioned above in which the wavelength corresponding to each measuring point is not stored, $RB(\lambda)$ is determined in such a way that linear interpolation based on the nearest value of the bandwidth of the wavelength is stored in the memory.

Next, the bandwidth of the wavelength $RB(\lambda)$ is converted into the bandwidth of the frequency $RBF(\lambda)$ according to the following formula.

$$RBF(\lambda)=RB(\lambda) \times C/\lambda^2 \qquad (2)$$

In above formula, $\lambda$ is represents the wavelength in the vacuum and C represents the velocity of light.

Further, adjusted characteristics of optical spectrum $PO(\lambda)$ is determined using the following formula.

$$PO=P(\lambda)/RBF(\lambda) \qquad (3)$$

After that, CPU 12 displays the $PO(\lambda)$ as a characteristic of the optical spectrum on the display section.

In this method, the bandwidth of the wavelength stored in the memory of the bandwidth of the wavelength 14 is converted into the bandwidth of the frequency, and adjusts the measured optical spectrum with the bandwidth of the frequency corresponding to the measured wavelength.

As mentioned above, in the present invention, the previously measured bandwidth of the wavelength by the dispersion spectroscope 20 corresponding to each measured wavelength is stored in the memory of the bandwidth of the wavelength 14, and the measured optical spectrum is adjusted by the bandwidth of the wavelength corresponding to the measured wavelength. Therefore, the correct optical spectrum can be measured without an influence of the change of the bandwidth of the wavelength corresponding to the measured wavelength.

The stored bandwidth of the resolution is converted to the bandwidth of the frequency, the optical spectrum is adjusted by the bandwidth of the frequency corresponding to the measured optical spectrum. Therefore, the light intensity per unit frequency can be measured without an influence of the change of the bandwidth of the wavelength corresponding to the measured wavelength.

The first method of measuring the above-mentioned in B represents the optical spectrum with a light intensity per unit wavelength and the second method of measuring the above-mentioned in C represents the optical intensity per unit frequency differently from the first one. These two methods are used depending on the measuring objectives.

Further, in the first and second methods of measuring mentioned above, the present invention can be applied to the optical spectrum measuring apparatus with selectable bandwidth of the wavelength by varying the width of the outgoing light slit 6.

In these cases, actual bandwidth of the wavelength should be stored corresponding to the respective possible bandwidth of the wavelength (or the width of the outgoing light slit) and the bandwidth of the wavelength corresponding to the width of the respective outgoing light slit should be used for adjusting operation.

Further, the present invention can be applied to the composition allowing the light emitted by the light source 1 go through the light fiber to the dispersion spectroscope 20. In this case, the output of the light fiber acts as the incident light slit 2, therefore the incident light slit 2 can be omitted.

The present invention can be applied to the composition with one concave mirror replacing the concave surface mirrors 3 and 5. Alternatively, the concave surface mirrors 3 and 5 can be replaced by a lens. Further, the present invention can be applied to conventional two-stage spectroscope.

What is claimed is:

1. An optical spectrum measuring apparatus which varies the bandwidth of the wavelength of the light according to passing light comprising:

a diffraction grating which diffracts parallel incident light and outputs the diffracted light according to the incident angle;

an outgoing light slit which passes said diffracted light with a wavelength smaller than the width of the slit;

a measurement means which measures the light intensity of the diffracted light passing through said outgoing light slit;

a control means which controls said width of the slit and said incident angle; and a storage means which stores the bandwidth of the wavelength of the light passing said outgoing light slit;

wherein said apparatus corrects said light intensity according to said bandwidth of the wavelength of the light passing through said outgoing light slit.

2. An optical spectrum measuring apparatus according to claim 1, further wherein said apparatus converts the bandwidth of the wavelength of the light passing the outgoing light slit to frequency, and corrects the light intensity with the bandwidth of the wavelength of the light passing the outgoing light slit.

3. An optical spectrum measuring apparatus according to claim 1, further comprising:

a converting means which converts the light into said parallel incident light;

a converging means which converges the diffracted light from said diffraction grating into said outgoing light slit; and a display means which displays the measurement result of said measurement mean.

4. An optical spectrum measuring apparatus according to claim 2, further comprising:

a converting means which converts the light into said parallel incident light;

a converging means which converges the diffracted light from said diffraction grating into said outgoing light slit; and a display means which displays the measurement result of said measurement mean.

* * * * *